March 7, 1967 — L. T. BARNES — 3,307,920
APPARATUS FOR PURIFYING EXHAUST GASES
Filed July 10, 1962 — 2 Sheets-Sheet 1

INVENTOR.
LLEWELLYN T. BARNES
BY
Amster & Levy
ATTORNEYS

INVENTOR.
LLEWELLYN T. BARNES
BY
ATTORNEYS

United States Patent Office 3,307,920
Patented Mar. 7, 1967

3,307,920
APPARATUS FOR PURIFYING EXHAUST GASES
Llewellyn T. Barnes, 155 Atlantic Ave.,
Freeport, N.Y. 11520
Filed July 10, 1962, Ser. No. 208,703
3 Claims. (Cl. 23—288)

The present invention relates to a method and apparatus for purifying exhaust gases resulting from the combustion of leaded gasoline in an internal combustion engine.

Various types of degassers have been devised in the past for eliminating waste products and nauseous gases resulting from the combustion of fuel and air in internal combustion engines such as used in conventional automotive vehicles and the like. In my Patent No. 3,032,969 issued May 8, 1962, for Venturi Degassing Attachment, there is disclosed means for eliminating obnoxious fumes from exhaust gases of an internal combustion engine. In my patent there is disclosed means for overcoming the production of obnoxious gases by rendering the fuel mixture comparatively lean, and there is further disclosed means for adding fluids such as oxygen, steam or water to the exhaust gases for oxiding and neutralising the exhaust gases passing out of the outlet port of each of the cylinders of an internal combustion engine. However, when leaded gasoline is employed, it has been found that at least some of the tetra ethyl lead is not burned and after the exhaust gases have passed through the Venturi degassing attachment residues and other obnoxious material may remain and may recombine. In order to eliminate both the tetra ethyl lead and other lead compounds from the exhaust gases and to further oxidize such gases as are not completely oxidized during passing through the Venturi degassing attachment, there is provided in accordance with an embodiment of the invention a catalytic degasser which includes a perforated chamber, a catalyst casing surrounding the chamber, an exhaust gas inlet which is connected to the Venturi degassing attachment or to the exhaust pipe from the manifold, and an outlet conduit, locking means being provided to attach both the exhaust gas inlet and outlets to the catalyst casing. A plurality of catalyst pellets are disposed in the space between the chamber and the casing so that exhaust gases from the inlet conduit will pass over the catalyst pellets into the chamber for oxygen reaction and thence out of the chamber through the exhaust gas outlet. In order to wash the catalyst pellets, a reservoir is connected to the casing and a pump is disposed between the reservoir and the casing for circulating the catalyst pellets between the reservoir and the casing. This may be done by a stream of fluid under pressure. The chamber is formed of a pair of perforated chamber sections which are held together in alignment and the catalyst casing includes a perforated retaining ring and a perforated screen with the ring and the screen holding the chamber sections in position and the bayonet locking means holding the ring to the exhaust gas inlet and outlet conduits.

A further object of the present invention is to provide an exhaust gas catalytic degasser which is designed to maintain extended service without interruption.

Another object is to provide a catalytic degasser employing catalyst pellets which are circulated so that the abrasive or rubbing action of the pellets on each other will remove at least some portion of the coatings of lead compounds on the pellets so that the catalyst pellets remain active.

Still another object of the invention resides in the provision of a compact and efficient catalyst degasser which includes means for washing the catalysts pellets in a convenient manner.

These, together with the various ancillary objects and features of the invention which will become apparent as the following description proceeds, are attained by the catalytic degasser and method of purifying exhaust gases, a preferred embodiment of the invention being illustrated in the accompanying drawings, by way of example only, wherein.

Figure 3:
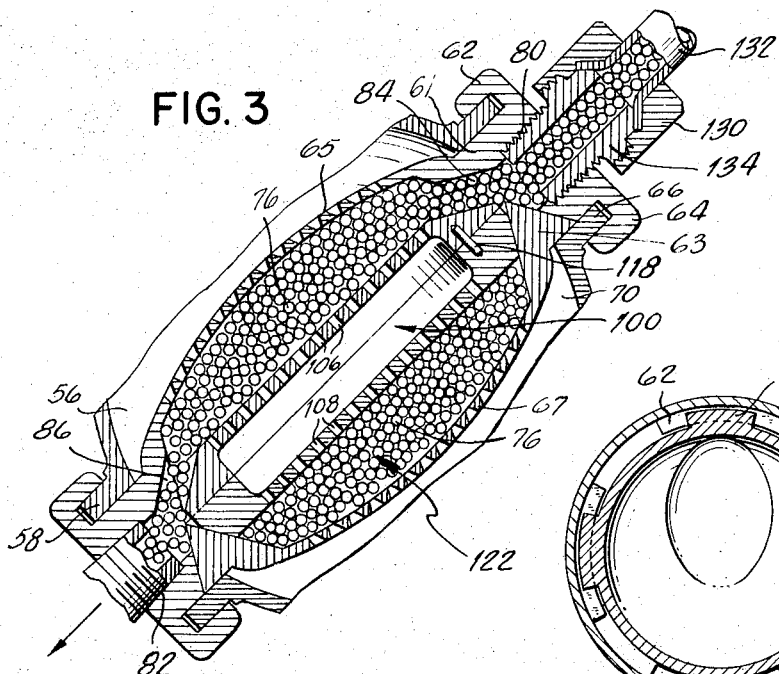
FIG. 3 is a sectional detail view looking in the direction normal to the view shown in FIG. 2 illustrating the manner in which the catalyst pellets are circulated.
Figure 4:
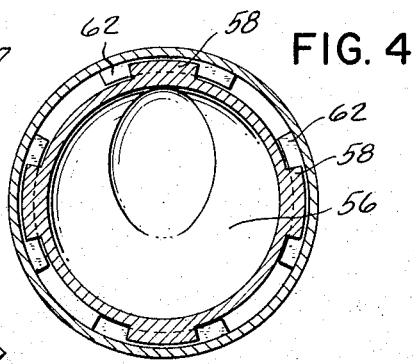
FIG. 4 is a transverse sectional view taken along the plane of line 4—4 in FIG. 1 illustrating the bayonet connection between the inlet conduit and the catalyst casing.
Figure 5:
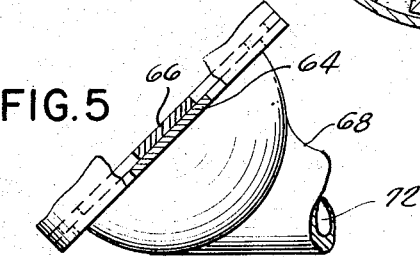
FIG. 5 is a partial elevational view with portions broken away to show other parts in section illustrating in particular the bayonet locking means for connecting the outlet conduit to the catalyst casing.
Figure 6:
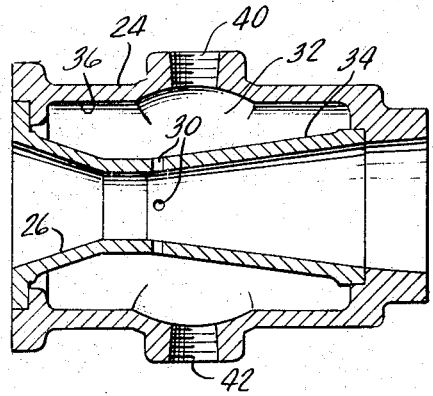
FIG. 6 is a cross sectional view of the Venturi degassing attachment adapted to be connected to the outlet manifold or like portion of an internal combustion engine for use in conjunction with the system forming the illustrated embodiment of the present invention.

With continuing reference to the accompanying drawings wherein like reference numerals designate similar parts throughout the various views, reference numeral 10 generally designates a Venturi degassing attachment which is adapted to be connected to the exhaust gas manifold of an internal combustion engine or like portion through which the exhaust gases of combustion must pass. The degassing attachment 10 may be connected between each of the cylinders and the exhaust manifold or the Venturi degassing attachment 10 may be connected after the exhaust manifold. The attachment 10 includes a casing 24 having a Venturi 26 mounted therein which has a restricted portion 28. At the restriction 28 there are provided a plurality of apertures 30 so as to suck fluid into the Venturi 26 from the annular space 32 between the outer wall 34 of the Venturi and the inner wall 36 of the casing 24. The Venturi 26 provides the passageway for the exhaust gases and the fluid in the space 32 will become intermingled with the exhaust gases as they pass through the Venturi 26 and into the exhaust gas manifold. In order to assure reduction of the obnoxious material in the exhaust gas passing through the Venturi 26, oxygen rich fluids are introduced into the space 32. To this end, oxygen, water, steam or the like are delivered into the space 32 through inlets 40 and 42. However, when leaded gasoline employing tetra ethyl lead to raise the octane rating of the gasoline and its anti-knock qualities is employed, various lead compounds as well as certain obnoxious exhaust gases will not be completely reduced in the Venturi 26. These exhaust gases are therefore led through the Venturi 26 and thence through a gate valve 50 or the like into an inlet conduit 52 of cast iron or steel which enlarges from a cylindrical portion 54 into a spherical portion 56 having a bayonet type flange 58 at the periphery. Lockingly secured to the bayonet flange 58 is a catalyst casing assembly 60 having a bayonet type flange 62 which is adapted to cooperate with the bayonet flange 58 to form a locking connection therewith. The catalyst casing assembly 60 also includes a bayonet type flange 64 which forms a bayonet locking arrangement with the peripheral bayonet type flange 66 on the exhaust gas conduit 68 of cast iron or steel which has a hemispherical shaped portion 70 leading into a cylindrical exhaust portion 72. The catalyst casing assembly 60 includes a pair of rings 61 and 63 provided with perforated screens 65 and 67 and are made of cast aluminum. As can be seen best in FIG. 3, the catalyst casing assembly is provided with a threaded inlet opening 80 and an outlet opening 82 and has an inlet passageway 84 communicating the interior of the catalyst casing assembly 60 with the inlet opening 80 and an outlet passageway 86 communicating the interior of the catalyst casing assembly 60 with the threaded outlet opening 82. A set screw 90 is used to detachably lockingly hold the pair of rings 61 and 63 together, with the complementary truncated conical surface 92 of the ring 61 engaging the complementary surface 94 on the ring 63.

Disposed within the catalyst casing assembly 60 is a chamber 100 which includes a pair of chamber sections 102 and 104 formed of cast bronze and perforated as at 106 and 108 to permit passage of gases into the chamber 100. The chamber sections 102, and 104 are provided with, respectively, tapered surfaces 110, 112 which engage the ring 61 and surfaces 114 and 116 which engage the ring 63 when the chamber 100 is seated properly in position. A dowel 118 is used to align the chamber sections and passageways 120 are formed in the chamber 100 to permit flow of catalyst pellets generally indicated at 122 therethrough. The catalytic pellets are disposed in the space 76 formed in the catalyst casing assembly 60 between the inner surface of the walls of the catalyst casing assembly 60 and the outer surface of the walls of the chamber. The catalyst pellets may be of the type disclosed in the patent to E. J. Houdry et al., Patent No. 2,867,497 of January 6, 1959, or may be of the type manufactured by Harshaw Chemical Co. as Vanadia Catalyst V–0801. These catalyst pellets catalytically cause oxidation of various types of exhaust gases and compounds found in exhaust gases.

By means of a threaded nut 130 a tube 132 is detachably connected to a fitting 134 secured in the threaded inlet opening 80 of the catalyst casing. The tube 132 is connected to a catalyst pellet reservoir 136. Another tube 138 is connected in a like manner to the outlet opening 82 and this conduit is connected to the reservoir with a pump 140 being disposed in the conduit 138 so that the pump which pumps air under pressure circulates the catalyst pellets in a fluid stream of air under pressure in the space 76 and back to the reservoir 136. The rubbing action of the catalyst pellets on each other will rub off the coatings of lead compounds from the exhaust gases which have become deposited thereon so that the catalyst pellets will remain active.

Figures 1, 2:
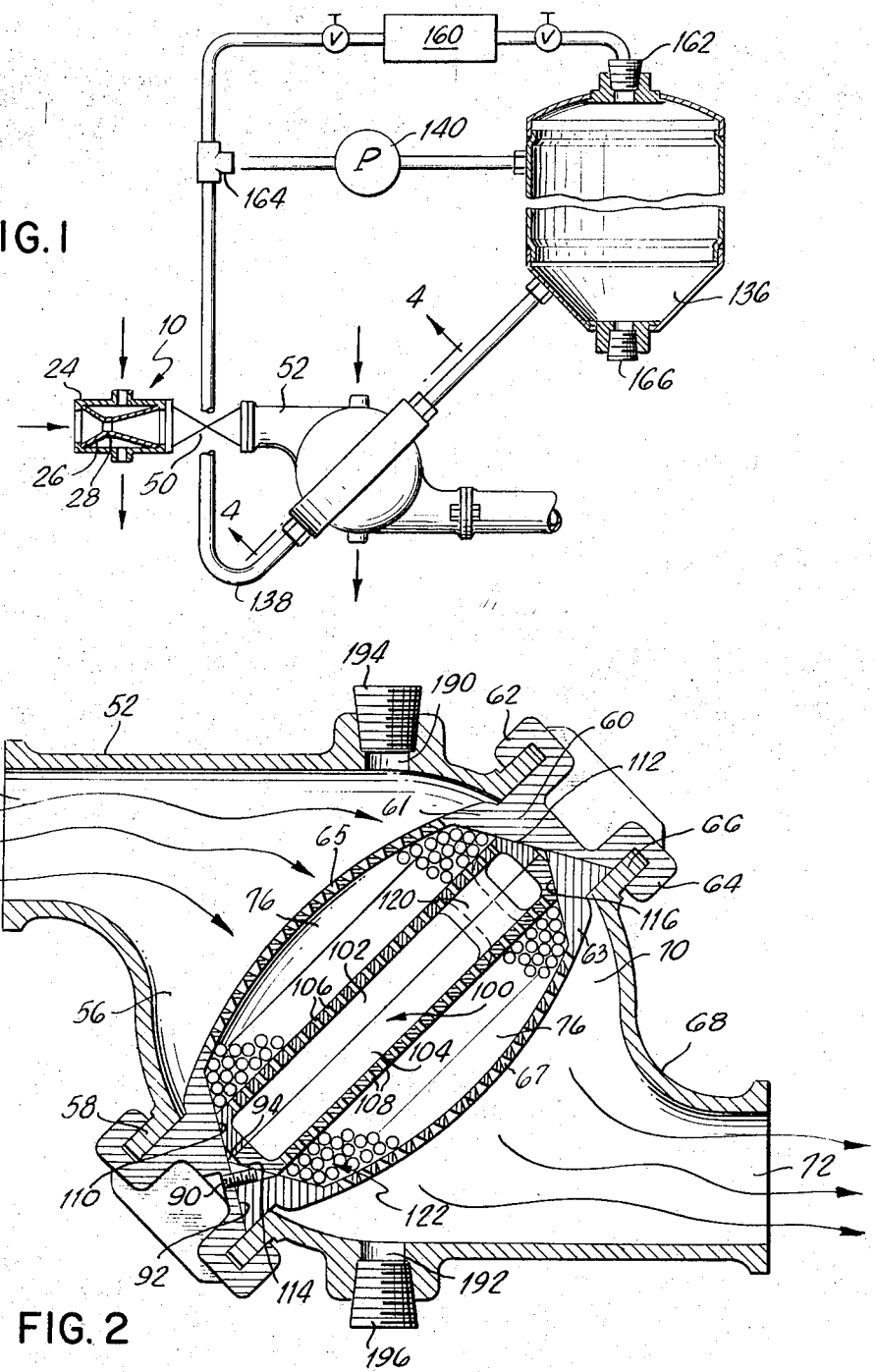
FIG. 1 is a schematic diagram illustrating an embodiment of the system forming the catalytic degasser of the present invention.
FIG. 2 is an enlarged cross sectional view of the main components of the catalytic degasser illustrating the catalyst casing and chamber in detail.

If it is desired to wash the catalyst pellets with an acid or with any other solution designed to dissolve the lead compounds and remove them from the surface of the catalyst pellets, there may be connected in the system as shown in FIG. 1 a suitable tank 160 for containing the acid which is connected to an inlet 162 on the reservoir 136 and to the conduit 138 through a fitting 164. A drain plug 166 may be provided for the reservoir 136 for either draining residue from the base of the tank 136 or for draining acid with impurities dissolved therein.

In use, exhaust gases flow through the Venturi degassing device 10 into the inlet conduit 52 and thence through the perforation over the catalyst pellets 122. The lead compounds will tend to coat the catalyst pellets, but since these catalyst pellets are at least intermittently circulated by means of a stream of air under pressure, the rubbing or abrasive action of one pellet on another will free the surface of the catalyst pellets from the lead coatings thereby permitting the catalyst pellets to remain active. The air under pressure will provide a source of oxygen and reaction will take place as the exhaust gases pass over the pellets and in the chamber 100 from whence the purified gases will pass out of the exhaust outlet 72. The pellets may be washed using the tank 160 or a tank may be connected to the threaded connections 190 and 192 normally closed by plugs 194 and 196.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A catalytic degasser comprising a chamber, a catalyst casing surrounding said chamber, exhaust gas inlet and outlet conduits, means detachably connecting said conduits to said casing, catalyst pellets disposed in the space between said chamber and said casing so that exhaust gas from said inlet conduit will pass over said catalyst pellets into said chamber for oxidation reaction, said chamber being formed of a pair of perforated chamber sections, means for holding said chamber sections in alignment, said casing including a pair of abutting rings provided with perforated screens, said rings holding said chamber sections in position, and means detachably holding said rings in contact with each other.

2. A catalytic degasser according to claim 1, including a reservoir connected to said casing, and pump means connected between said reservoir and said casing for circulating said catalyst pellets between said reservoir and said casing.

3. A catalytic degasser according to claim 2, including means connected to said reservoir for washing said catalyst pellets.

References Cited by the Examiner

UNITED STATES PATENTS

| | | | |
|---|---|---|---|
| 1,522,111 | 1/1925 | Franck-Philipson | 23—288 |
| 2,772,147 | 11/1956 | Bowen et al. | 23—288 |
| 2,909,415 | 10/1959 | Houdry | 23—288 |
| 2,942,932 | 6/1960 | Elliott | 23—2 |
| 3,025,132 | 3/1962 | Innes | 23—2 |
| 3,041,149 | 6/1962 | Houdry | 23—288 |
| 3,053,773 | 9/1962 | Calvert. | |
| 3,061,416 | 10/1962 | Kazokas | 23—288 |
| 3,094,394 | 6/1963 | Innes et al. | 23—288 |
| 3,186,804 | 6/1965 | Fisher | 23—288 |

MORRIS O. WOLK, *Primary Examiner.*

MAURICE A. BRINDISI, JOSEPH SCOVRONEK, E. C. THOMAS, *Assistant Examiners.*